United States Patent
Batson (10) Patent No.: US 8,694,802 B2
(45) Date of Patent: Apr. 8, 2014

(54) SYSTEM AND METHOD FOR CREATING TAMPER-RESISTANT CODE

(75) Inventor: James D. Batson, Saratoga, CA (US)

(73) Assignee: Apple Inc., Cupertino, CA (US)

(*) Notice: Subject to any disclaimer, the term of this patent is extended or adjusted under 35 U.S.C. 154(b) by 2709 days.

(21) Appl. No.: 10/837,413

(22) Filed: Apr. 30, 2004

(65) Prior Publication Data
US 2005/0246554 A1    Nov. 3, 2005

(51) Int. Cl.
*G06F 11/30* (2006.01)

(52) U.S. Cl.
USPC .......................................... 713/194; 726/27

(58) Field of Classification Search
None
See application file for complete search history.

(56) References Cited

U.S. PATENT DOCUMENTS

| | | | |
|---|---|---|---|
| 5,933,497 A | 8/1999 | Beetcher et al. | |
| 6,668,325 B1 | 12/2003 | Collberg et al. | |
| 6,694,435 B2 | 2/2004 | Kiddy | |
| 6,779,114 B1 * | 8/2004 | Gu et al. | 713/189 |
| 7,203,933 B2 | 4/2007 | Souloglou et al. | |
| 7,203,934 B2 | 4/2007 | Souloglou et al. | |
| 7,210,133 B2 | 4/2007 | Souloglou et al. | |
| 7,287,166 B1 * | 10/2007 | Chang et al. | 713/187 |
| 2002/0016918 A1 | 2/2002 | Tucker et al. | |
| 2002/0016948 A1 | 2/2002 | Rein et al. | |
| 2003/0188187 A1 | 10/2003 | Uchida | |
| 2003/0217280 A1 | 11/2003 | Keaton et al. | |
| 2004/0003264 A1 | 1/2004 | Zeman et al. | |
| 2004/0151306 A1 | 8/2004 | Kiddy | |

FOREIGN PATENT DOCUMENTS

| | | |
|---|---|---|
| EP | 01069355 A1 | 9/2001 |
| EP | 1559012 B1 | 5/2007 |
| WO | WO-01/69355 A1 | 9/2001 |
| WO | WO-01/69366 A2 | 9/2001 |
| WO | WO-02/01327 A2 | 1/2002 |
| WO | WO-2004/042564 A2 | 5/2004 |
| WO | WO-2005/111761 A2 | 11/2005 |

OTHER PUBLICATIONS

"Invitation to Pay Additional Fees, for Application No. PCT/US2005/012835, Mailed Aug. 4, 2005", 5 Pages.
Chang, H., et al., "Protecting Software Code by Guards", *Lecture Notes in Computer Science*, (Jun. 10, 2002), 160-175.
"Application Serial No. 05735415.1 Office Action Mailed Sep. 16, 2009", 6 pgs.
"Australian Application No. 2005242865, Examiner Report mailed on Nov. 5, 2009", 2 pgs.
"European Patent Application Serial No. 05735415.1, Response to Communication pursuant to Article 96(2), dated Nov. 7, 2007", 8 pgs.

* cited by examiner

*Primary Examiner* — Kaveh Abrishamkar
(74) *Attorney, Agent, or Firm* — Womble Carlyle Sandridge & Rice LLP (57) ABSTRACT

A system and method for creating tamper-resistant code are described herein. In one embodiment, the method comprises receiving a first object code block. The method also comprises translating the first object code block into a second code block, wherein the translating includes applying taper-resistance techniques to the first object code block or the second object code block. The method also comprises executing the second object code block.

28 Claims, 11 Drawing Sheets

SYSTEM AND METHOD FOR CREATING TAMPER-RESISTANT CODE

FIELD

This invention relates generally to the field of computer data processing and more particularly to techniques for creating tamper-resistant software.

BACKGROUND

Tamper-resistant software is software that is difficult to change, tamper with, and/or attack. Code obfuscation is one technique for achieving tamper-resistant software. Generally, the goal of code obfuscation is to make it difficult for attackers to determine what is happening in a block of code. If attackers use debuggers or emulators to trace instructions, code obfuscation can make the code difficult to understand or change.

According to one code obfuscation technique, additional instructions are added to a program. The instructions are added to confuse attackers and/or produce ancillary results, which must be verified before execution can continue past certain points. One problem with this method of code obfuscation is that it typically requires code to be modified by hand. Moreover, it may require existing software to be completely restructured, especially if parts of the software must run in a tamper resistant interpretive environment with system service restrictions.

SUMMARY

A system and method for creating tamper-resistant code are described herein. In one embodiment, the method comprises receiving a first object code block. The method also comprises translating the first object code block into a second object code block, wherein the translating includes applying to the first object code block or the second object code block tamper-resistance techniques. The method also comprises executing the second object code block.

In one embodiment the system comprises a processor and a memory unit coupled with the processor. In the system, the memory unit includes a translator unit to translate at runtime blocks of a first object code program into a blocks of a second object code program, wherein the blocks of the second object code program are to be obfuscated as a result of the translation, and wherein the blocks of the second object code program include system calls. The memory unit also includes a runtime support unit to provide service for some of the system calls, wherein the runtime support unit is to deny service for others of the system calls, and wherein service is denied based on a tamper resistance policy.

BRIEF DESCRIPTION OF THE FIGURES

The present invention is illustrated by way of example and not limitation in the Figures of the accompanying drawings in which.

DESCRIPTION OF THE EMBODIMENTS

Systems and methods for creating tamper-resistant code are described herein. In the following description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams will be described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Moreover, it should be understood that although the flow diagrams depict serial operations, certain embodiments could perform certain of those operations in parallel.

This description of the embodiments is divided into four sections. In the first section, a system level overview is presented. In the second section, an exemplary implementation is described. In the third section, methods for using exemplary embodiments are described. In the fourth section, an exemplary hardware and operating environment is described.

System Level Overview

Figure 1:
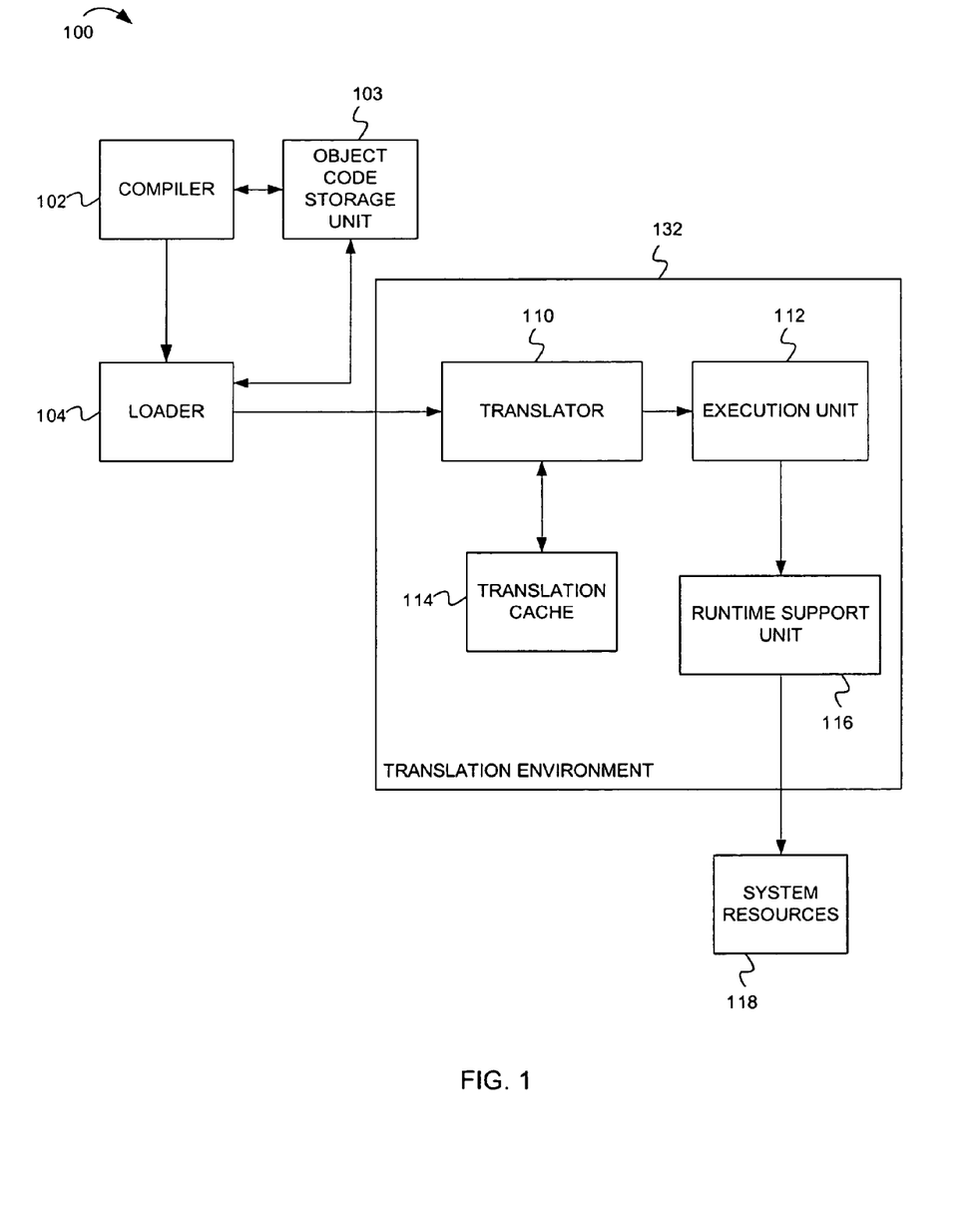
FIG. 1 is a block diagram illustrating a system for creating tamper-resistant code using dynamic translation, according to exemplary embodiments of the invention.
Figure 2:
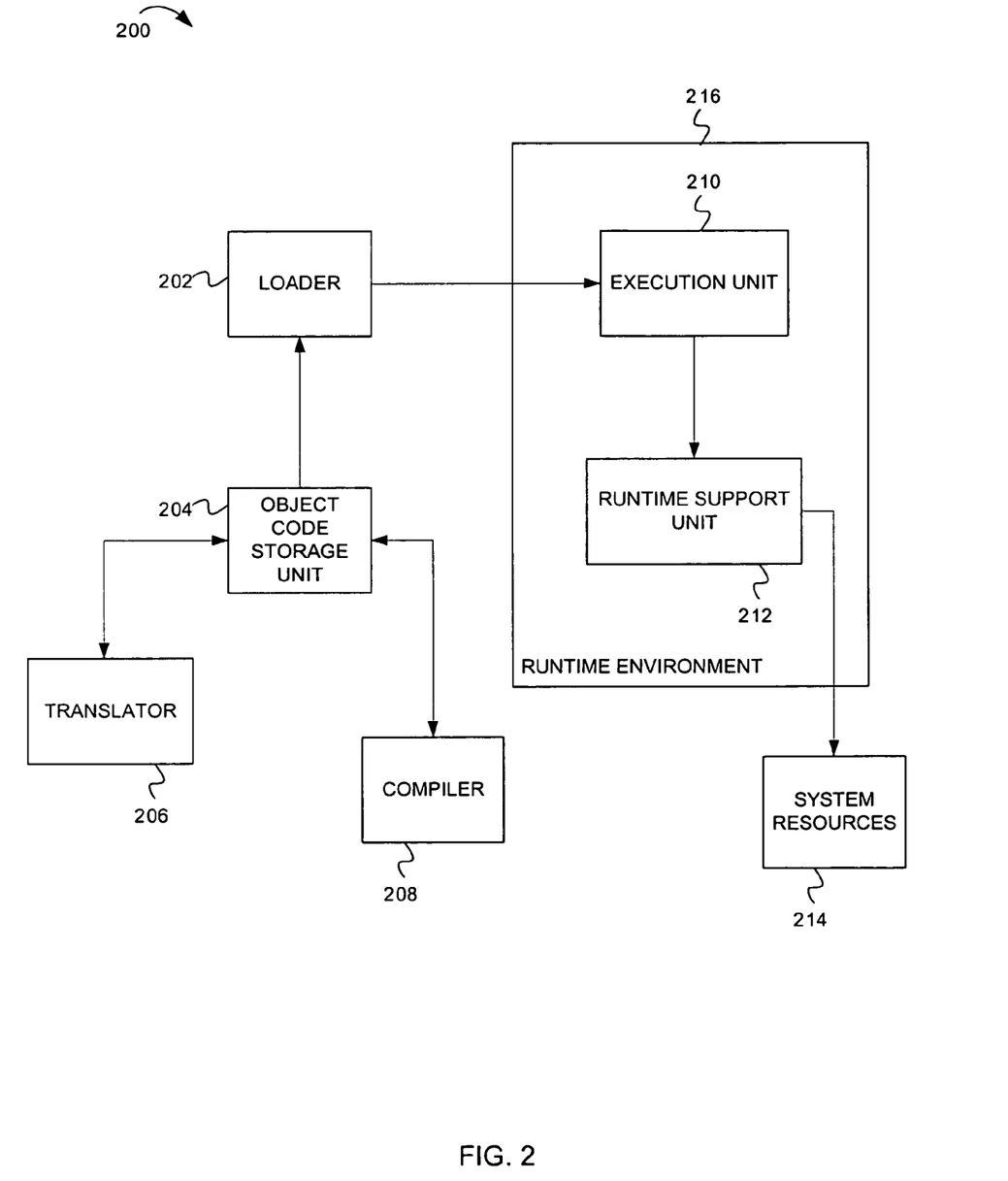
FIG. 2 is a block diagram illustrating a system for creating tamper-resistant code using static translation, according to exemplary embodiments of the invention.

This section provides a system architecture of exemplary embodiments of the invention. FIGS. 1-2 show alternative systems for creating tamper-resistant code. Operations of the functional units of FIGS. 1-2 are described in the following sections. The following discussion describes several tamper resistance techniques, including techniques for obfuscating code.—The code obfuscation techniques can be used alone or in combination with other code obfuscation techniques or tamper resistance techniques such as restricting system calls or verifying ancillary results.

FIG. 1 is a block diagram illustrating a system for creating tamper-resistant code using dynamic translation, according to exemplary embodiments of the invention. As shown in FIG. 1, the tamper-resistant code system 100 includes a translation environment 132, which includes a translator 110, an execution unit 112, a translation cache 114, and a runtime support unit 116. The system 100 also includes a compiler 102, which is connected to an object code storage unit 103. The object code storage unit 103 is connected to a loader 104, which is connected to the translator 110. The translator 110 is connected to the translation cache 114. The translator 110 is also connected to the execution unit 112, which is connected to the runtime support unit 116. The runtime support unit 116 is connected to system resources 118.

According to one embodiment, the compiler 102 is a high-level language compiler (e.g., an Objective C compiler, C++ compiler, Java compiler, C compiler, etc.). The compiler 102 compiles a high-level source code program into one or more object code blocks, which it stores in the object code storage unit 103. The object code storage unit 103 can be any suitable storage media (e.g., RAM, ROM, disk, etc.).

The loader 104 loads object code blocks into the translator 110. Operations of the system 100 will be described below.

FIG. 2 is a block diagram illustrating a system for creating tamper-resistant code using static translation, according to exemplary embodiments of the invention. As shown in FIG. 2, the tamper-resistant code system 200 includes a runtime environment 216. The runtime environment 216 includes an execution unit 210 and a runtime support unit 212. The tamper-resistant code system 200 also includes a compiler 208, which is connected to an object code storage unit 204. The object code storage unit 204 is connected to a translator 206. The object code storage unit 204 is also connected to a loader 202, which is connected to the execution unit 210. The execution unit 210 is connected to the runtime support unit 212. The runtime support unit 212 is connected to system resources 214.

According to one embodiment, the compiler 208 is a high-level language compiler (e.g., an Objective C compiler, C++ compiler, Java compiler, C compiler, etc.). The compiler 208 compiles a high-level source code into one or more object code block. The compiler 208 also stores the object code blocks in the object code storage unit 204. The compiler 208 can be remotely located on a network server, while the other components of the system 200 are locally stored on a network client (see description of compiler 102 above). In one embodiment, the object code storage unit 204 also stores object code produced by the translator 206. According to embodiments of the invention, the object code storage unit 204 can be any suitable storage media (e.g., RAM, ROM, disk, etc.).

In one embodiment, the runtime environment 216 includes the execution unit 210 and the runtime support unit 212. According to embodiments, the execution unit 210 can be any suitable mechanism for executing program instructions. For example, the execution unit 210 can include any processors and/or memory necessary for executing program instructions. The program instructions can be byte codes or object code instructions. Additionally, the program instructions can include system calls, which are serviced by the runtime support unit 212. In one embodiment, the runtime support unit 212 includes software and/or hardware for servicing the system calls. Operations of the execution unit 210 and the runtime support unit 212 are described in greater detail below (see the next section).

According to embodiments of the invention, the functional units (e.g., the translator 110, runtime support unit 116, etc.) of FIGS. 1 and 2 can be integrated or divided, forming a lesser or greater number of functional units. According to embodiments, the functional units can include queues, stacks, or other data structures necessary for performing the functionality described herein. Moreover, the functional units can be communicatively coupled using any suitable communication method (message passing, parameter passing, signals, etc.). Additionally, the functional units can be connected according to any suitable interconnection architecture (fully connected, hypercube, etc.). Any of the functional units used in conjunction with embodiments of the invention can include machine-readable media including instructions for performing operations described herein. Machine-readable media includes any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc. According to embodiments of the invention, the functional units can be other types of logic (e.g., digital logic) for executing the operations for creating tamper-resistant code.

Exemplary Implementation

Figure 4:
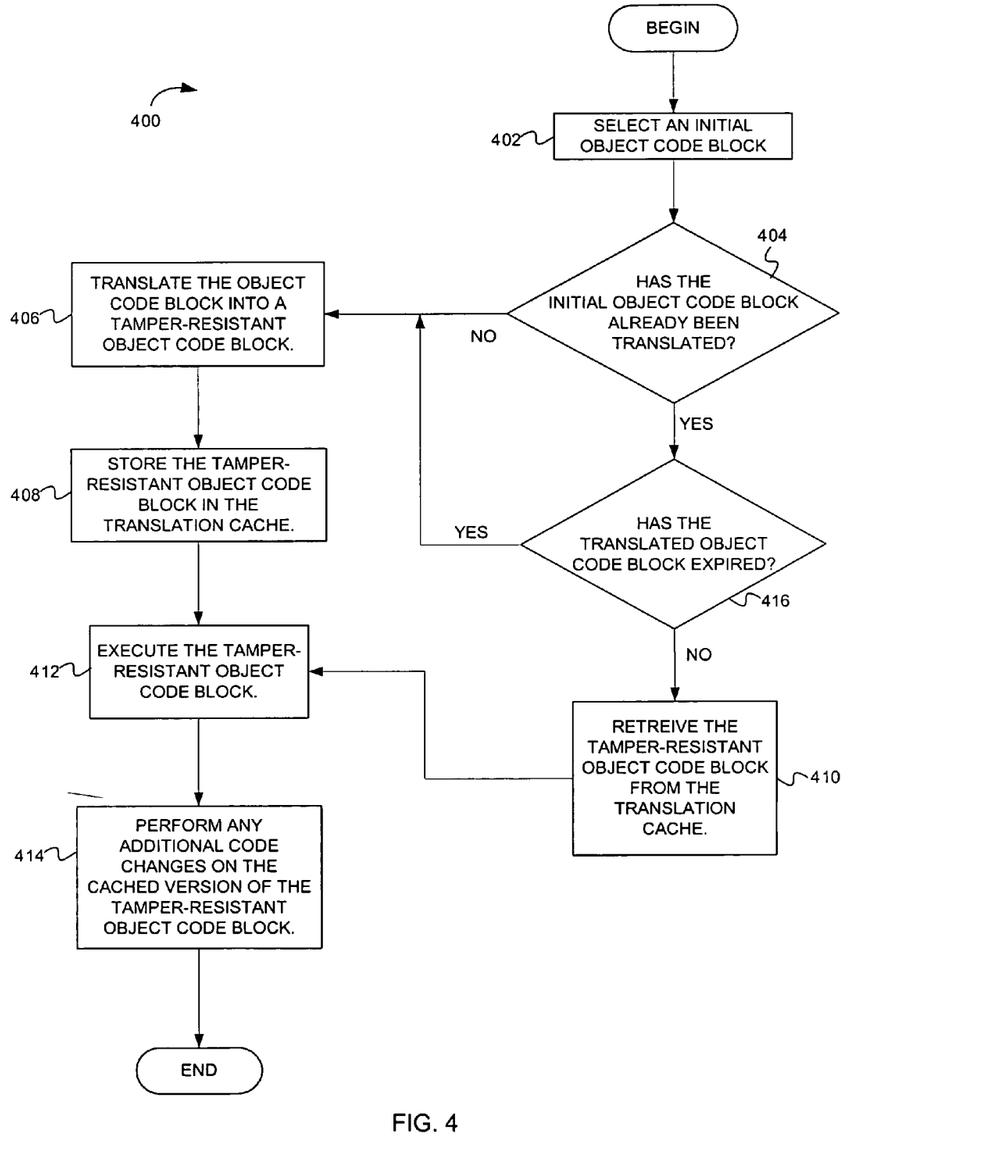
FIG. 4 is a flow diagram illustrating operations for translating and executing object code, according to exemplary embodiments of the invention.
Figure 5:
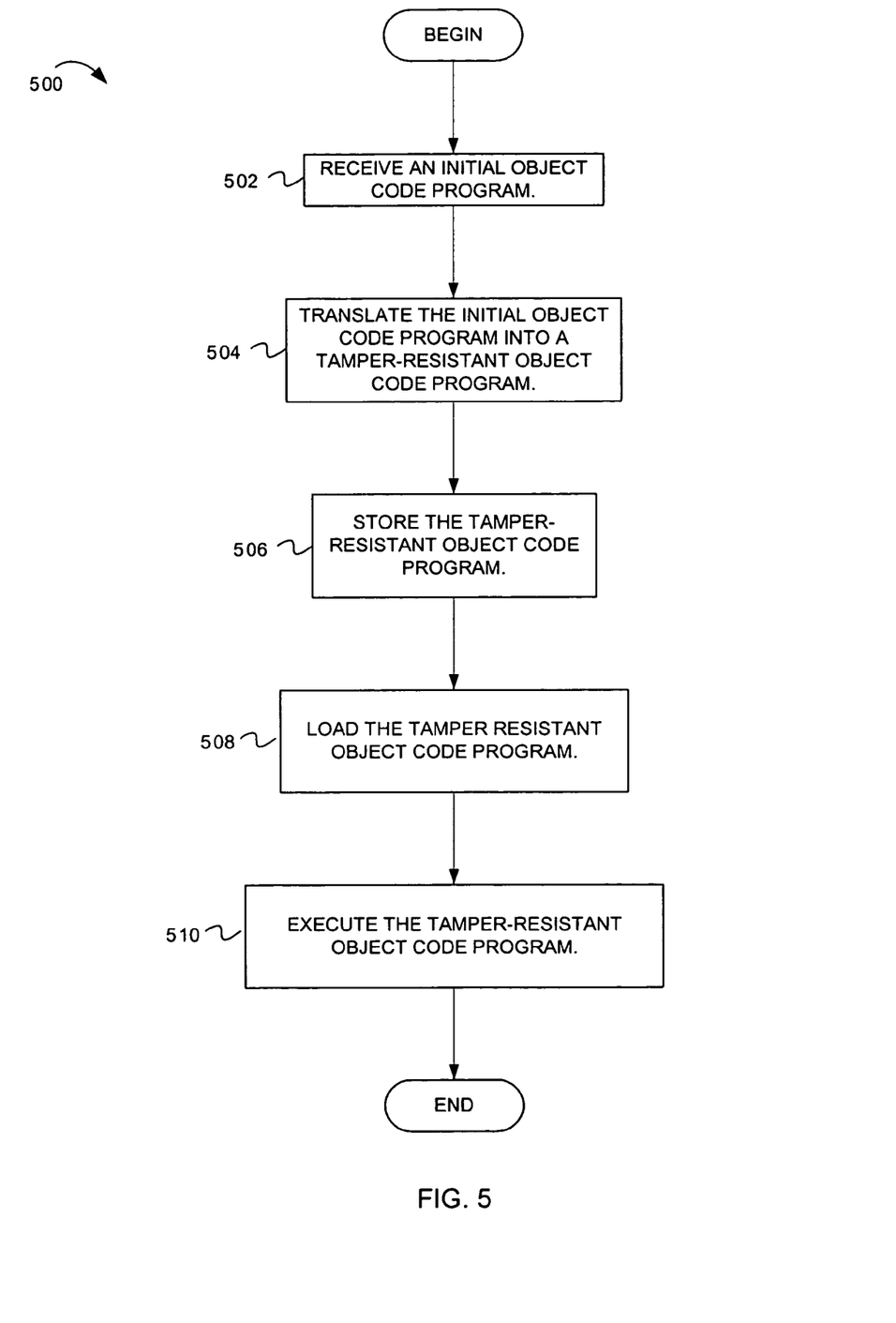
FIG. 5 is a flow diagram illustrating operations for statically translating and executing an object code program, according to exemplary embodiments of the invention.
Figure 6:
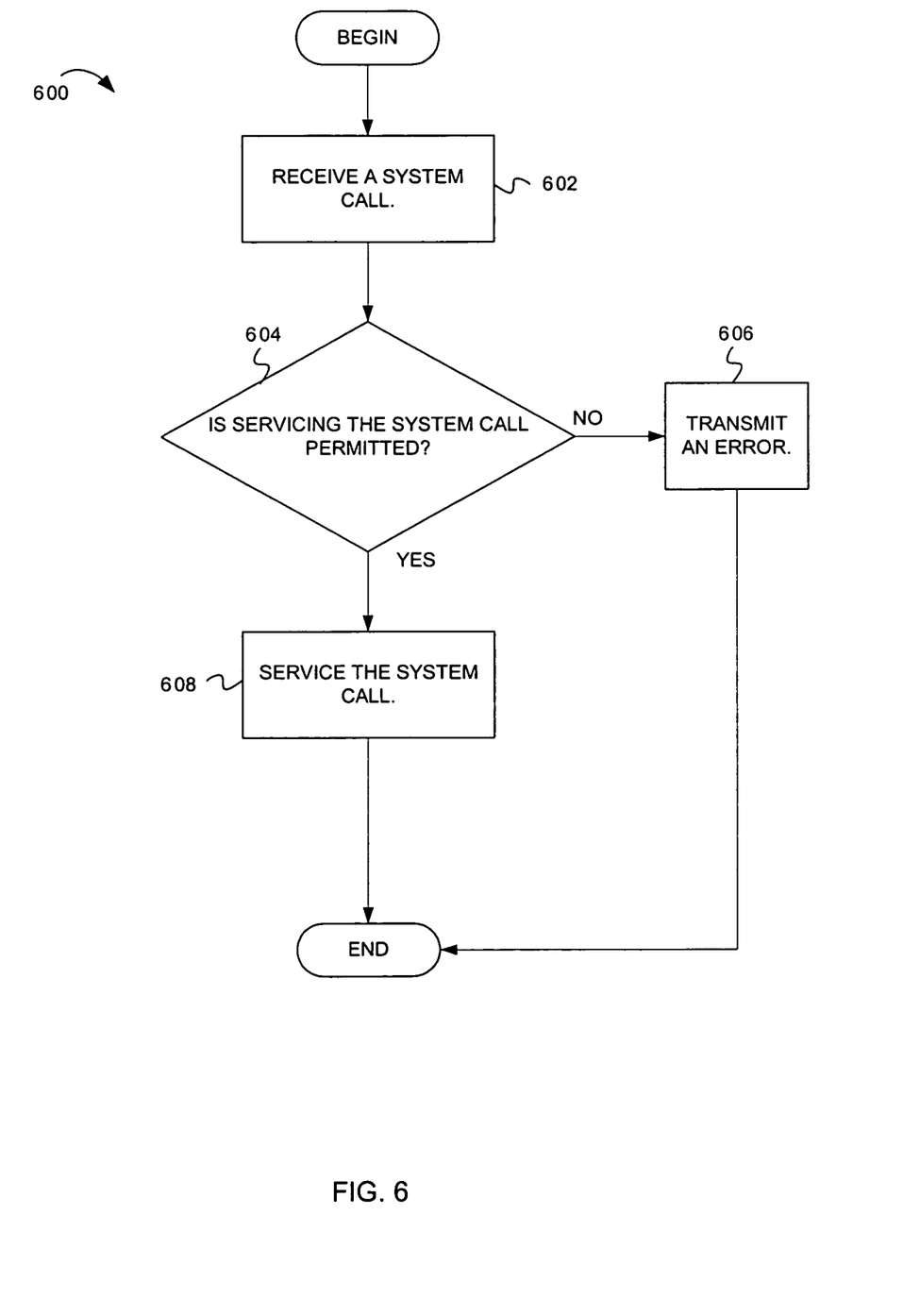
FIG. 6 is a flow diagram illustrating operations for servicing system calls based on a tamper-resistance policy, according to exemplary embodiments of the invention.

This section describes exemplary operations performed by the system described above. In this section, FIGS. 3-7 will be presented. In the following discussion, FIG. 3 describes general operations for compiling, translating and executing tamper-resistant code. FIGS. 4 and 5 describe methods for dynamically and statically translating object code into a tamper-resistant object code. FIG. 6 describes run-time support operations, while FIG. 7 describes a method for obfuscating object code.

Figure 3:
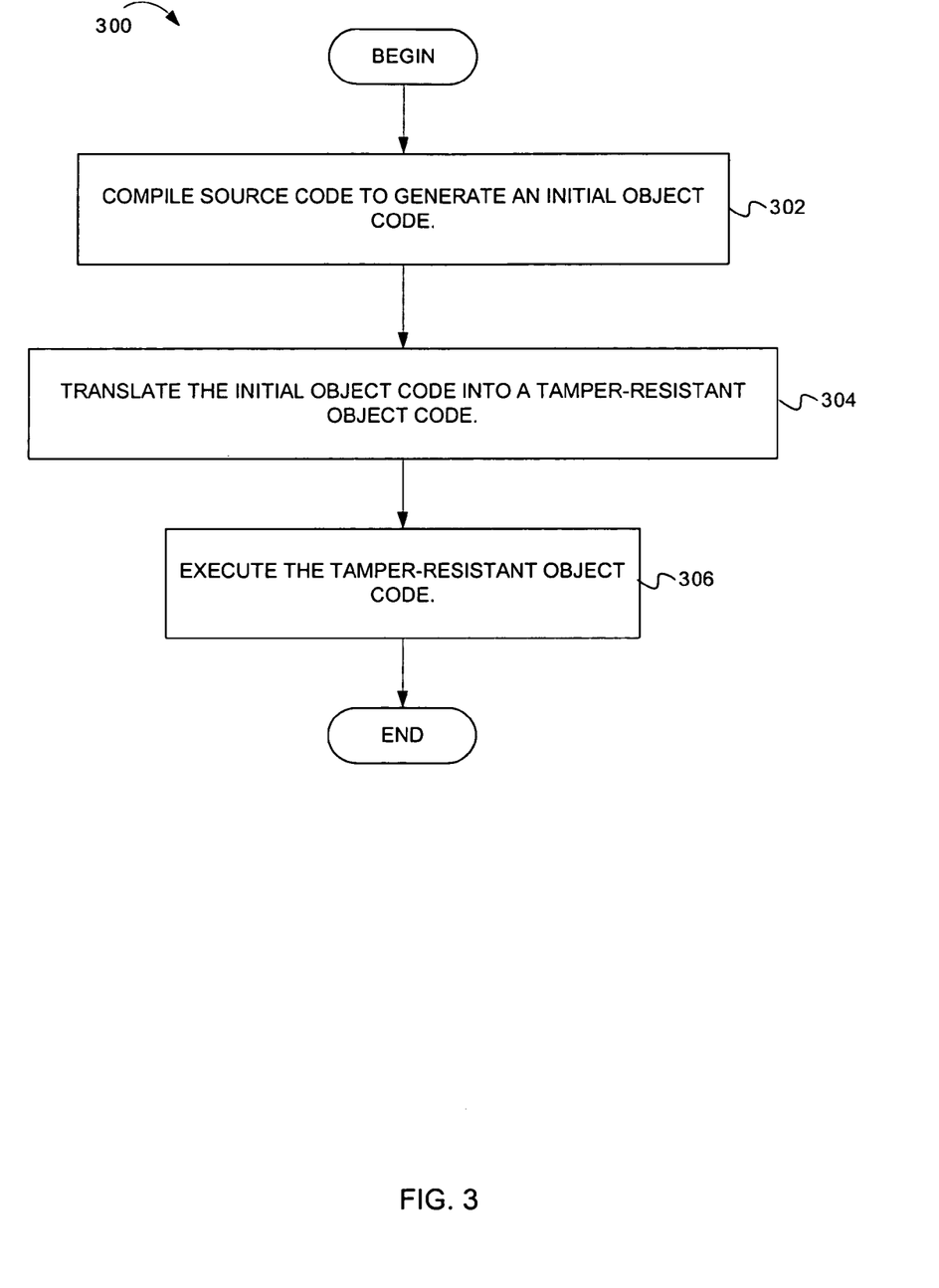
FIG. 3 is a flow diagram illustrating operations for creating, translating, and executing software, according to exemplary embodiment of invention.

FIG. 3 is a flow diagram illustrating operations for creating, translating, and executing software, according to exemplary embodiment of invention. This flow diagram describes general operations of a tamper-resistant code system, while detailed operations of the system's components are described in subsequent flow diagrams. The operations of the flow diagram 300 will be described with reference to the exemplary tamper-resistant code system of FIG. 1. The flow diagram 300 commences at block 302.

At block 302, source code is compiled to generate an initial object code. For example, the compiler 102 compiles a source code program to generate an initial object code program. In one embodiment, the initial object code includes byte codes, which are executable on a virtual machine. In one embodiment, the initial object code is in a format suitable for execution on a particular processor architecture (e.g., PowerPC, MIPS, Intel Pentium, etc.). According to embodiments, the object code can be in any suitable loader format. The flow continues at block 304.

At block 304, the initial object code is translated into a tamper-resistant object code. For example, the translator 110 translates the initial object code into a tamper-resistant object code. In one embodiment, the loader 104 retrieves the initial object code from a storage unit (not shown) and passes the initial object code to the translator 110. After receiving the initial object code, the translator 110 translates the initial object code into a tamper-resistant object code by performing tamper-resistance techniques during the translation. In one embodiment, the translator 110 can translate the initial object code into a different tamper resistant object code each time it performs a translation. In one embodiment, tamper-resistance techniques include obfuscating the object code. Operations for obfuscating object code are described in greater detail below, with reference to FIG. 7. The flow continues at block 306.

As shown in block 306, the tamper-resistant code object is executed. For example, the execution unit 112 executes the tamper-resistant object code. In one embodiment, the translator 110 transmits the tamper-resistant object code to the execution unit 112, where it is executed. Operations for translating and executing tamper-resistant object code are described in greater detail below, with reference to FIGS. 4-5. From block 306, the flow ends. As noted above, FIG. 3 describes general operations of a system for creating tamper-resistant code, while FIGS. 4 and 5 describe more detailed operations of the translator and execution unit.

FIG. 4 is a flow diagram illustrating operations for dynamically translating and executing object code, according to exemplary embodiments of the invention. The operations of the flow diagram 400 will be described with reference to the exemplary system of FIG. 1. In particular, the flow diagram 400 will primarily describe operations performed by the translator 110 and the execution unit 112. The flow diagram 400 commences at block 402.

As shown in block 402, an initial object code block is selected. For example, the translator 110 selects an initial object code block to operate upon. In one embodiment, the initial object code block includes byte codes that are executable on a virtual machine, while alternative embodiments call for object code blocks that are executable on a processor. The flow continues at block 404.

At block 404, it is determined whether the initial object code block has already been translated. For example, the translator 110 determines whether the initial object code block has already been translated. In one embodiment, the translator 110 inspects the translation cache 114 to determine whether the initial object block has already been translated. If the initial object code block has not already been translated, the flow continues at block 406. Otherwise, the flow continues at block 416.

At block 416, it is determined whether the translated tamper-resistant object code block has expired. For example, the translator 110 finds the translated tamper-resistant object code block in the translation cache 114 and determines whether it has expired. A translated tamper-resistant block expires after it has been stored in the translation cache 114 for longer than a predetermined time period. For example, if a translated tamper-resistant block has been stored in the cache for 5 time units or more, it is expired. If the translated object code block has expired, the flow continues at block 406. Otherwise, the flow continues at block 410. In certain embodiments, translated tamper resistant object code blocks do not expire; thus in those embodiments, block 416 can be omitted from the flow. As such, the "yes" path from 404 would continue at block 410.

At block 410, a tamper-resistant object code block is retrieved from the translation cache. For example, the translator 110 retrieves a tamper-resistant object code block from the translation cache 114. From block 410, the flow continues at block 412.

At block 406, the initial object code block is translated into a tamper-resistant object code block. For example, the translator 110 translates the initial object code block into a tamper-resistant object code block. In one embodiment, the translator 110 obfuscates the initial object code block before translating it into a tamper-resistant object code block. Therefore, as a result of obfuscating the initial object code block, the translation produces an obfuscated object code block (i.e., the tamper-resistant object code block includes obfuscated code). In an alternative embodiment, the translator 110 translates the initial object code block into a second object code block, which the translator 110 obfuscates to form the tamper-resistant object code block. In an alternative embodiment, the translator 110 translates and obfuscates the initial object code block in the same process. That is, in creating the tamper-resistant object code block, the translator 110 performs an instruction-by-instruction translation and obfuscation of the initial object code block. In certain embodiments, each time an object code block is translated the translator 110 generates a different object block. For example, when a cached translated object code block expires, the translator 110 generates a translated object code block that is different from the expired block.

In one embodiment, the translator 110 translates the initial object code block into a tamper-resistant object code block and employs a means for authenticating the tamper-resistant object code block. For example, the translator 110 calculates and stores a checksum of the tamper-resistant object code block. Alternatively, the translator 110 digitally signs the tamper-resistant object code block. Before executing the tamper-resistant object code block, the execution unit 112 can verify the checksum or authenticate the digital signature to ensure that the tamper-resistant object code block has not been altered. As yet another alternative, the execution unit 112 verifies that certain ancillary results have been produced by instructions added to the original object code. Although only checksums, digital signatures, and ancillary result verification are described, any suitable technique for authenticating the tamper-resistant object code block can be employed by embodiments of the invention. The flow continues at block 408.

At block 408, the tamper-resistant object code block is stored in a translation cache. For example, the translator 110 stores the tamper-resistant object code block in the translation cache 114. The flow continues at block 412.

As shown in block 412, the tamper-resistant object code block is executed. For example, the execution unit 112 fetches and executes the tamper-resistant object code block. In one embodiment, the execution unit 112 uses the runtime support unit 116 to execute system calls contained within the tamper-resistant object code block. Operations of the runtime support unit 116 are described in greater detail below, in the discussion of FIG. 6. The flow continues at block 414.

At block 414, any desired alterations are performed on the cached tamper-resistant object code block. For example, if desired, the translator 110 can further alter the object blocks that are stored in the translation cache 114. From block 414, the flow ends. Although the flow 400 is illustrated as translating and executing a single object code block, it should be understood that the flow 400 could be repeated for additional object code blocks.

The operations of flow 400 allow for fast code execution. Since the code is translated to native processor instructions, the result is faster than a tamper-resistant interpreter environment.

FIG. 5 is a flow diagram illustrating operations for statically translating and executing an object code program, according to exemplary embodiments of the invention. The flow diagram of FIG. 5 will be described with reference to the exemplary translation system of FIG. 2. In particular, the flow diagram 500 primarily describes operations of the translator 206 and the execution unit 210. The flow diagram 500 commences at block 502.

At block 502, an initial object code program is received. For example, the translator 206 fetches an object code program from the object code storage unit 204. In one embodiment, the translator 206 receives the object code program from the object code storage unit 204 during the course of a software installation process (i.e., the process of storing the software and configuring it for execution). In an alternative embodiment, the translator 206 receives the object code program over a network connection, during a software installation process. The flow continues at block 504.

At block 504, an initial object code program is translated into a tamper-resistant object code program. For example, the translator 206 translates an object code program into a tamper-resistant object code program. In one embodiment this includes obfuscating the initial object program, which is described in further detail below (see FIG. 7). As noted above, in one embodiment, the translator 206 determines a checksum or digital signature of the tamper-resistant object code program. The checksum can be used by the execution unit 210 to determine whether the tamper-resistant object code program has been altered. The flow continues at block 506.

At block 506, the tamper-resistant object code program is stored. For example, the translator 206 stores the tamper-resistant object code program in the object code storage unit 204. The flow continues at block 508.

At block 508, a tamper-resistant object code program is loaded. For example, the loader 202 loads a tamper-resistant object code program into the execution unit 210. The flow continues at block 510.

At block 510, the tamper-resistant object code program is executed. For example, the execution unit 210 executes the tamper-resistant object code program. In one embodiment, the object program includes system calls, which request access to the system resources 214. In one embodiment, the execution unit 210 works in concert with the runtime support unit 212 to service the system calls. Operations for servicing system calls are described in greater detail below, in the discussion of FIG. 6. In one embodiment the tamper-resistant object code program can be executed on a different computer system. For example, the load operation (block 508) loads the tamper-resistant object code into a computer system other than that which performed the translation (block 504). From block 510, the flow ends.

While the discussion of FIGS. 4 and 5 above described operations for dynamically and statically creating tamper-resistant object code, FIG. 6 describes operations for servicing system calls.

FIG. 6 is a flow diagram illustrating operations for servicing system calls based on a tamper-resistance policy, according to exemplary embodiments of the invention. The operations of the flow diagram 600 primarily describe operations of the runtime support unit 116. The operations of the flow diagram of FIG. 6 will be described with reference to the exemplary system described in FIG. 1. The flow diagram 600 commences at block 602.

As shown in block 602, a system call is received. For example, the runtime support unit 116 receives a system call from the execution unit 112. In one embodiment, a system call is a mechanism for requesting resources from an operating system. According to embodiments, system calls are object code instructions or byte codes that cause the execution unit 112 to perform restricted operations, such as providing access to system resources (e.g., disk drives, memory management unit, etc.) The flow continues at block 604.

At block 604, it is determined whether servicing the system call is permitted. For example, the runtime support unit 116 determines whether it is permitted to service the system call. In one embodiment, the runtime support unit 116 checks a tamper-resistance policy to determine whether it is permitted to service the system call. According to embodiments, the tamper-resistance policy can be represented in a data structure that is stored within the runtime support unit 116. The runtime support unit 116 inspects the data structure to determine whether a tamper-resistance policy allows for servicing the system call. If the runtime support unit 116 is permitted to service the system call, the flow continues at block 608. Otherwise, the flow continues at block 606.

As shown in block 606, an error is transmitted. For example, the runtime support unit 116 transmits an error to the execution unit 112. From 606, the flow ends.

At block 608, the system call is serviced. For example, the runtime support unit 116 services the system call. In one embodiment, the runtime support unit 116 services the system call by providing access to system resources 118. In one embodiment, the execution unit 112 and the system resources 118 are controlled by a first operating system, while the system calls are formatted for use with a second operating system. Therefore, the runtime support unit 116 determines which services the second operating system has to provide in order to service a system call formatted for the first operating system. In other words, the runtime support unit 116 maps system calls from another operating system onto services of the present operating system (i.e., the operating system controlling the execution unit 112). In one embodiment, the first and second operating systems are generally the same, but where the second operating system supports a restricted set of system calls. From block 608, the flow ends.

Certain embodiments can obfuscate code by performing one or more of the operations described below. In one embodiment, code obfuscation is achieved by determining an obfuscation identifier and performing one or more operations based on the identifier. The identifier can be a machine-specific attribute, such as a ROM serial number, hardware address, clock value, etc. Alternatively, the identifier can be determined from a user attribute, such as a user identifier, computer identifier, account identifier, or other user related information. After determining the identifier, extraneous code, which is generated based on the identifier, can be inserted into the object code. Additionally, object code features that have no direct source code equivalents can be created based on the identifier; those object code features can then be inserted into the object code.

As yet another obfuscation technique, additional code that will produce ancillary results can be created based on the identifier. The additional code can then be inserted into the object code. When the code fails to execute when an identifier is different, tamper resistance is improved.

Although several code obfuscation techniques and tamper resistance techniques are described herein, embodiments of the invention allow for any code obfuscation techniques or tamper resistance techniques to be applied during translation.

Methods of the Invention

This section describes methods performed by embodiments of the invention. In certain embodiments, the methods are performed by instructions stored on machine-readable media (e.g., software), while in other embodiments, the methods are performed by hardware or other logic (e.g., digital logic).

In this section, FIGS. 7-10 will be discussed. In particular, FIG. 7 describes operations performed by a dynamic translator for creating tamper-resistant code, while FIG. 8 describes dynamic translator operations for creating tamper-resistant code using identifier-based code obfuscation. FIG. 9 describes operations for servicing system calls based on a tamper-resistance policy. Additionally, FIG. 10 describes operations for install-time object code obfuscation.

Figure 7:
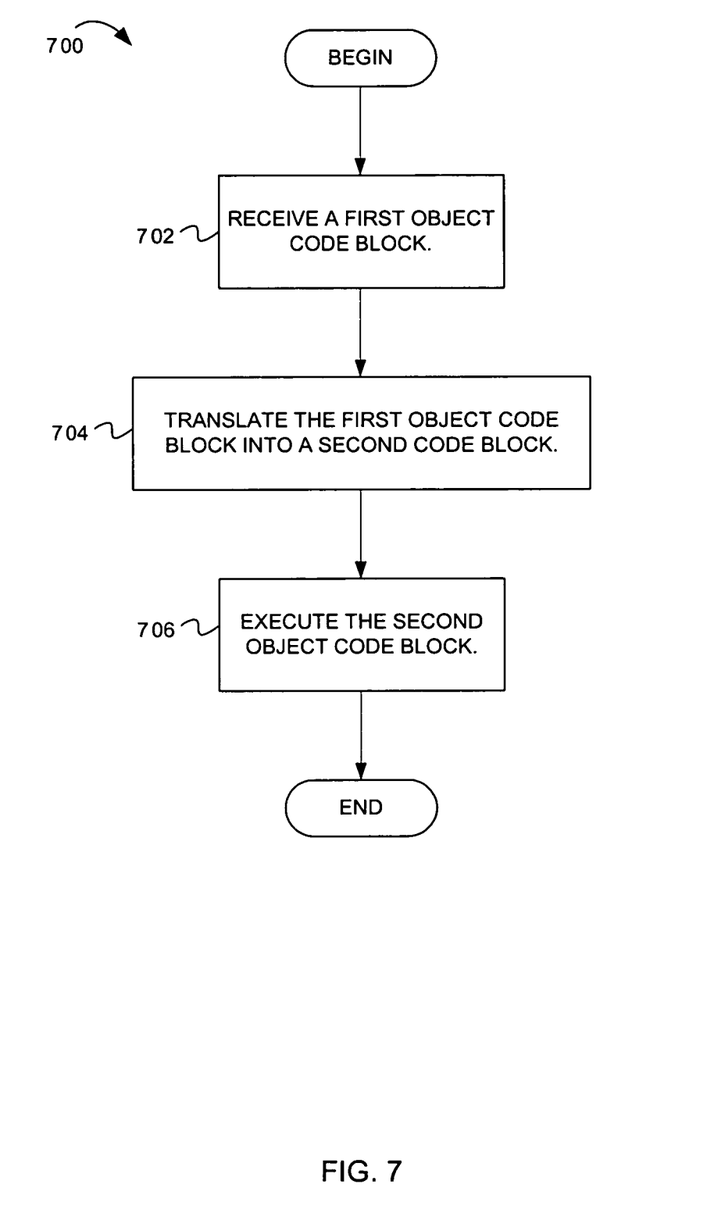
FIG. 7 is a flow diagram illustrating a method for creating tamper-resistant code using dynamic translation, according to exemplary embodiments of the invention.

FIG. 7 is a flow diagram illustrating a method for creating tamper-resistant code using dynamic translation, according to exemplary embodiments of the invention. The flow diagram 700 commences at block 702, wherein a first object code block is received. The flow continues at block 704. At block 704, the first object code block is translated into a second code block. The flow continues at block 706. At block 706, the second code block is executed. From block 706, the flow ends.

Figure 8:
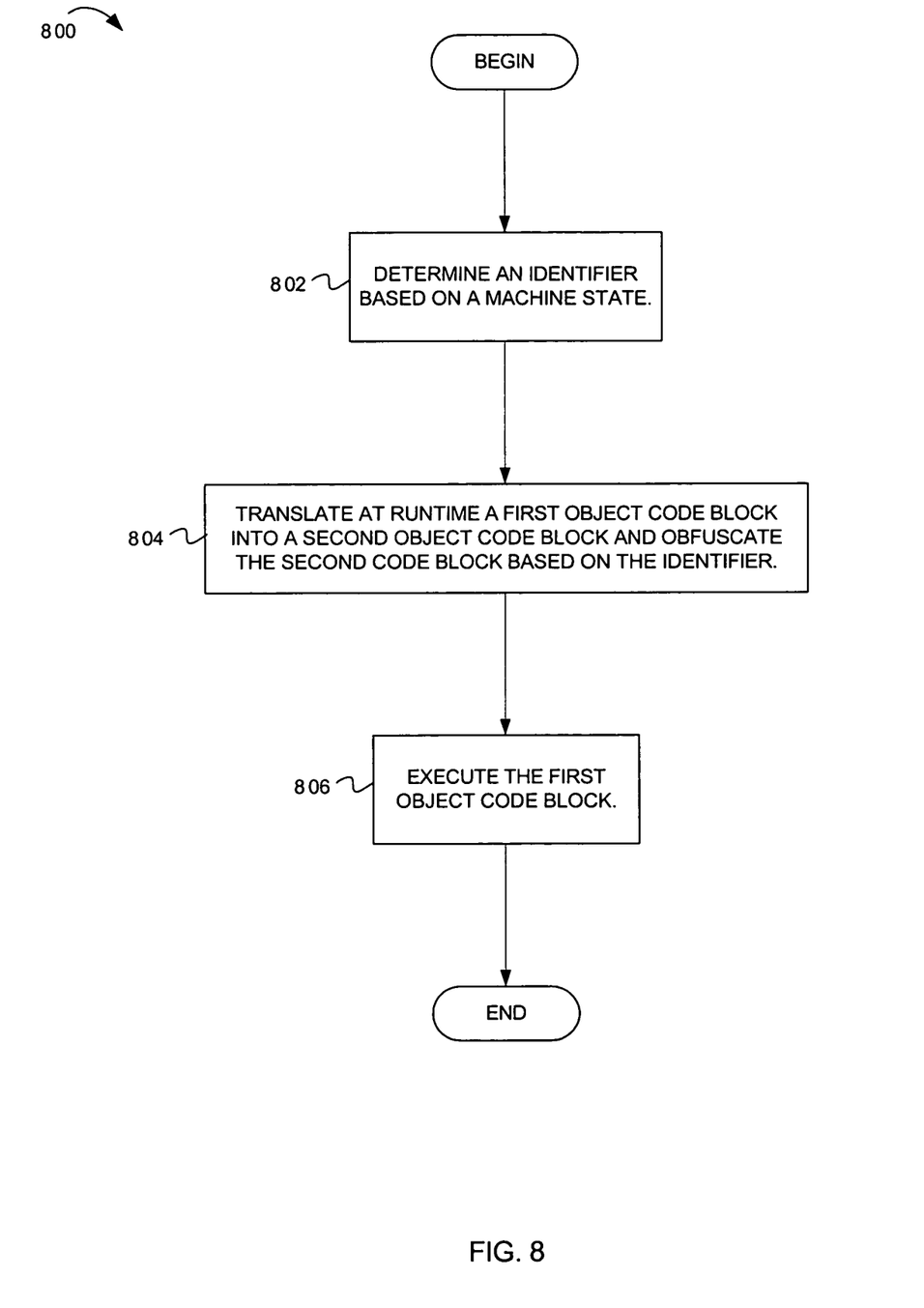
FIG. 8 is a flow diagram illustrating operations for creating tamper-resistant code using identifier-based code obfuscation, according to exemplary embodiments of the invention.
Figure 9:
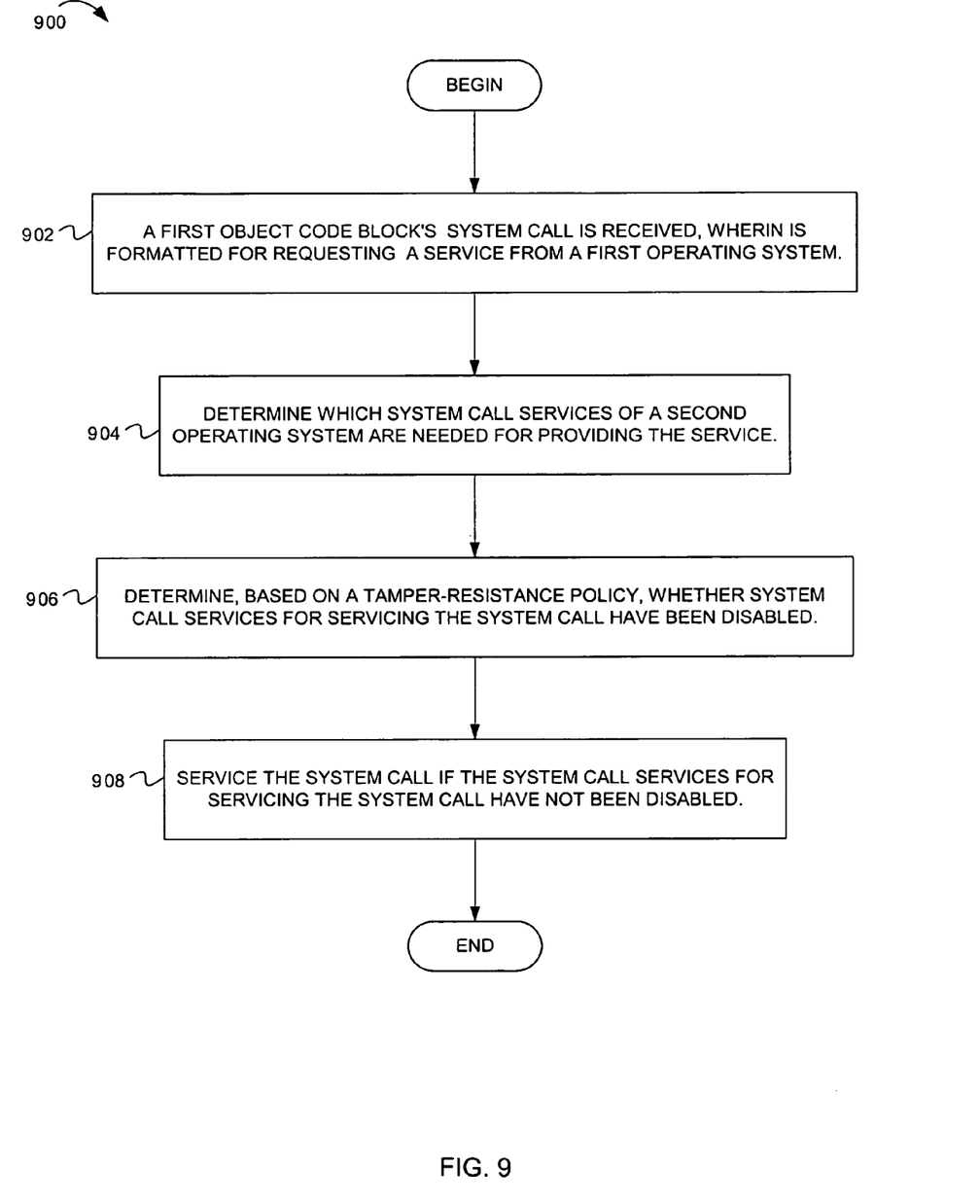
FIG. 9 is a flow diagram illustrating operations for servicing system calls based on a tamper-resistance policy, according to exemplary embodiments of the invention.

FIG. 8 is a flow diagram illustrating operations for creating tamper-resistant code using identifier-based code obfuscation, according to exemplary embodiments of the invention. The flow diagram 800 begins at block 802. At block 802, an identifier is determined based on a machine state. The flow continues at block 804. At block 804, a first object code block is translated into a second object code block and the second object code block is obfuscated using the identifier. The flow continues at block 906. At block 806, the first block is executed. From block 806, the flow ends.

FIG. 9 is a flow diagram illustrating operations for servicing system calls based on a tamper-resistance policy, according to exemplary embodiments of the invention. The flow diagram 900 begins at block 902. At block 902, a first object code block's system call is received, wherein the system call is formatted for requesting a service from a first operating system. The flow continues at block 904. As shown in block 904, it is determined which system call services of a second operating system are needed for providing the service. The flow continues at block 906. At block 906, it is determined, based on a tamper-resistance policy, whether system call services for servicing the system call have been disabled. The flow continues at block 908. As shown block 908, the system call is serviced if the system calls for servicing the system call have not been disabled. From block 908, the flow ends.

Figure 10:
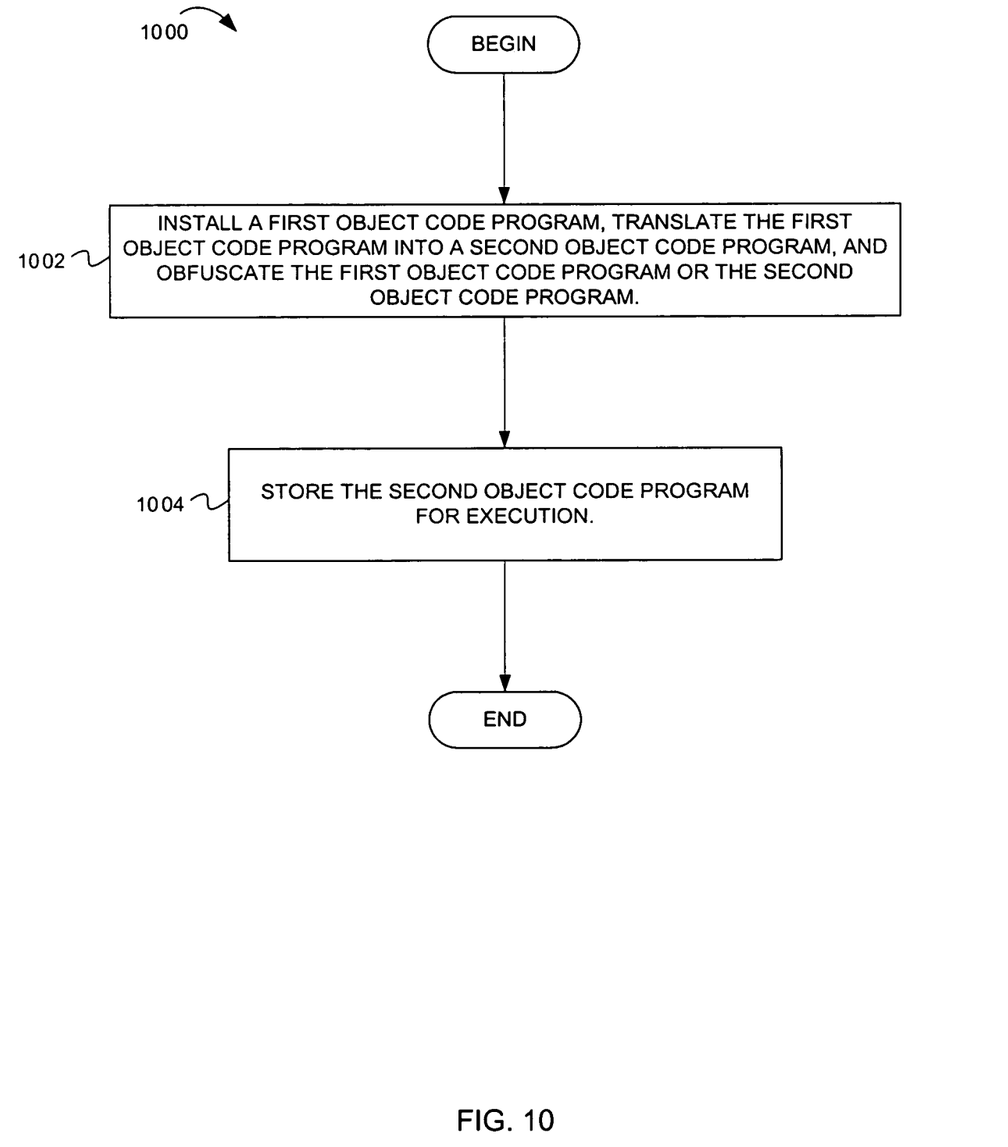
FIG. 10 is a flow diagram illustrating operations for translating and obfuscating object code when it is installed, according to exemplary embodiments of the invention.

FIG. 10 is a flow diagram illustrating operations for translating and obfuscating object code when it is installed, according to exemplary embodiments of the invention. The flow diagram 1000 begins at block 1002. At block 1002, a first object code program is installed, the first object code program is translated into a second object code program, and the first object code program or the second object code program is obfuscated. The flow continues at block 1004. As shown in block 1004, the second object code program is stored for execution. From block 1004, the flow ends.

Hardware and Operating Environment

This section provides an overview of the exemplary hardware and the operating environment in which embodiments of the invention can be practiced.

Figure 11:
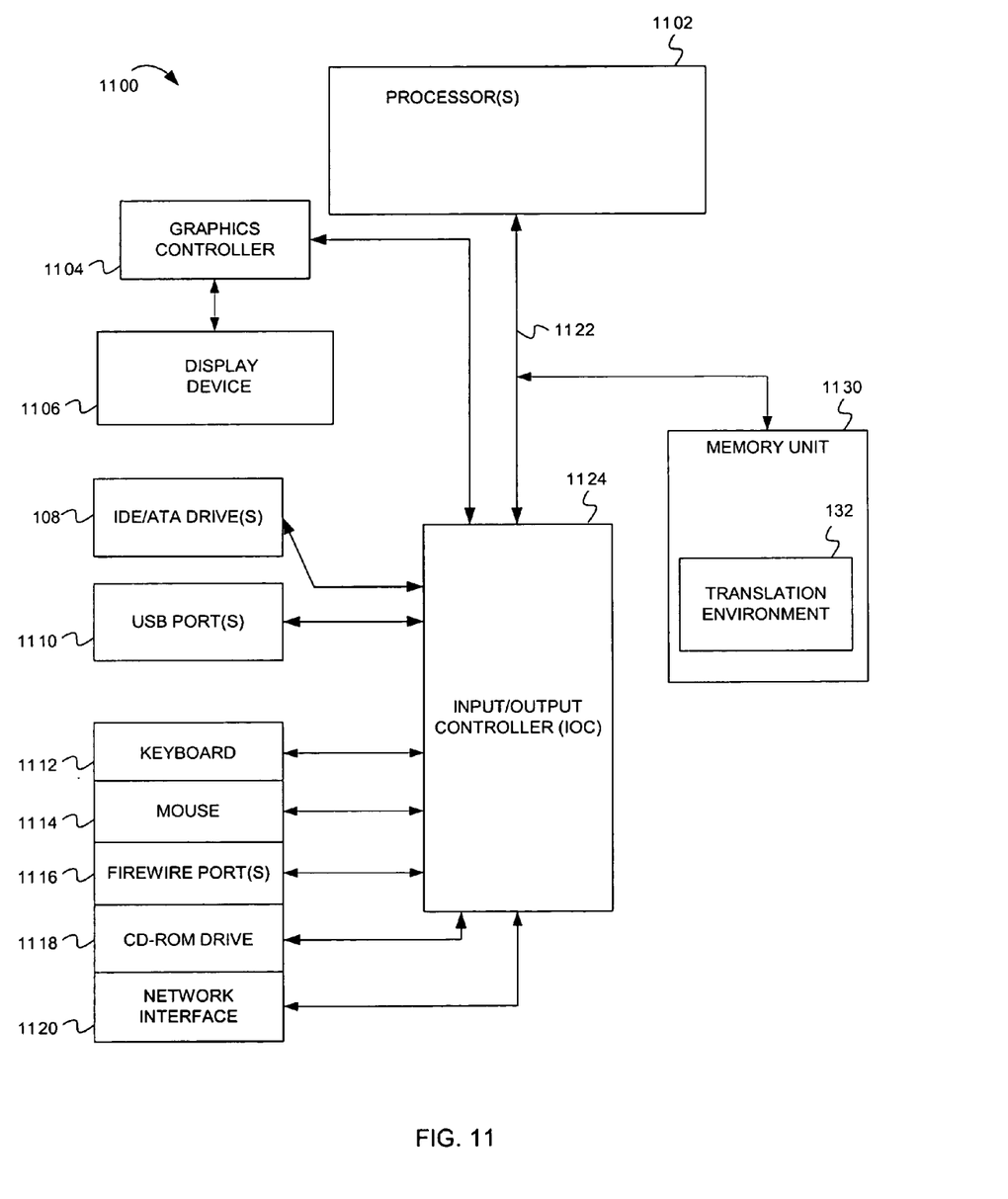
FIG. 11 illustrates an exemplary computer system used in conjunction with certain embodiments of the invention.

FIG. 11 illustrates an exemplary computer system used in conjunction with certain embodiments of the invention. As illustrated in FIG. 11, computer system 1100 comprises processor(s) 1102. The computer system 1100 also includes a memory unit 1130, processor bus 1122, and Input/Output controller (IOC) 1124. The processor(s) 1102, memory unit 1130, and IOC 1124 are coupled to the processor bus 1122. The processor(s) 1102 may comprise any suitable processor architecture. The computer system 1100 may comprise one, two, three, or more processors, any of which may execute a set of instructions in accordance with embodiments of the present invention.

The memory unit 1130 includes a translation environment 132. The memory unit 1130 stores data and/or instructions, and may comprise any suitable memory, such as a dynamic random access memory (DRAM), for example. The computer system 1100 also includes IDE drive(s) 1108 and/or other suitable storage devices. A graphics controller 1104 controls the display of information on a display device 1106, according to embodiments of the invention.

The input/output controller (IOC) 1124 provides an interface to I/O devices or peripheral components for the computer system 1100. The IOC 1124 may comprise any suitable interface controller to provide for any suitable communication link to the processor(s) 1102, memory unit 1130 and/or to any suitable device or component in communication with the IOC 1124. For one embodiment of the invention, the IOC 1124 provides suitable arbitration and buffering for each interface.

For one embodiment of the invention, the IOC 1124 provides an interface to one or more suitable integrated drive electronics (IDE) drives 1108, such as a hard disk drive (HDD) or compact disc read only memory (CD ROM) drive, or to suitable universal serial bus (USB) devices through one or more USB ports 1110. For one embodiment, the IOC 1124 also provides an interface to a keyboard 1112, a mouse 1114, a CD-ROM drive 1118, and one or more suitable devices through one or more firewire ports 1116. For one embodiment of the invention, the IOC 1124 also provides a network interface 1120 though which the computer system 1100 can communicate with other computers and/or devices.

In one embodiment, the computer system 1100 includes a machine-readable medium that stores a set of instructions (e.g., software) embodying any one, or all, of the methodologies for dynamically loading object modules described herein. Furthermore, software can reside, completely or at least partially, within memory unit 1130 and/or within the processor(s) 1102.

Thus, a system and method for creating tamper-resistant code have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method, comprising:
    determining an identifier based on one or more machine attributes or user attributes;
    translating at run-time a first object code block executable by a first machine into a second object code block executable by a second machine, wherein the translating includes obfuscating the second object code block, and wherein the obfuscating is based on the identifier;
    storing the second object code block for execution;
    executing the second object code block;
    receiving a system call formatted for requesting a service from a first operating system, wherein the system call is included in the first object code block;
    determining which system call services of a second operating system are needed for providing the service;

determining whether the system call services for providing the service are disabled, wherein the determining is based on a tamper-resistance policy; and servicing the system call when the system call services are not disabled.

2. The method of claim 1, wherein the obfuscating is applied such that the second object code block fails to later execute when the identifier is different.

3. The method of claim 2, wherein the machine attributes include at least one of a hardware address and a Read Only Memory serial number.

4. The method of claim 2, wherein the user attributes are selected from a set consisting of a user identifier, user password, user account name, and user account number.

5. The method of claim 1, wherein the obfuscation includes inserting additional code into the first object code block or the second object code block.

6. The method of claim 1, wherein the obfuscating includes adding object code that produces ancillary results to at least one of the first object code block and the second object code block, and wherein the second object code block fails to execute without the ancillary results.

7. The method of claim 1, wherein the machine attributes are based on a clock.

8. The method of claim 1, wherein the machine attributes include a hardware address or a Read Only Memory serial number.

9. The method of claim 1, wherein the user attributes are selected from a set consisting of a user identifier, user password, user account name, and user account number.

10. The method of claim 1, wherein the first machine is a virtual machine, and wherein the first object code block includes byte codes which are suitable for execution on the virtual machine.

11. The method of claim 1, wherein the tamper-resistance policy disables system call services that access system resources.

12. The method of claim 1, wherein the first operating system is selected from a set consisting of Mac OS X, Linux, and Microsoft Windows.

13. The method of claim 1, wherein the second operating system is selected from a set consisting of Mac OS X, Linux, and Microsoft Windows.

14. A method comprising:
receiving a first object code program, wherein the receiving includes statically translating the first object code program executable on a first machine into a second object code program that is executable on a second machine, and wherein the statically translating includes determining an identifier based on a machine attribute or a user attribute;
obfuscating the first object code program or the second object code program, wherein the obfuscating depends on the identifier;
storing the second object code program for execution;
executing the second object code program;
receiving a system call formatted for requesting a service from a first operating system, wherein the system call is included in the first object code program;
determining which system call services of a second operating system are needed for providing the service;
determining whether the system call services for providing the service are disabled, wherein the determining is based on a tamper-resistance policy; and
servicing the system call when the system call services are not disabled.

15. The method of claim 14, wherein the obfuscation includes inserting additional code into the first object code program or the second object code program.

16. The method of claim 15, wherein the inserted additional code produces ancillary results.

17. The method of claim 14, wherein the static translation is performed on a network server, and the second object code program is stored on a network client.

18. The method of claim 14, wherein at least one of the first machine and second machine includes an operating system selected from a set consisting of Microsoft Windows, Linux, and Mac OS X.

19. The method of claim 14, wherein the first object code program or the second object code program is received over a network connection.

20. The method of claim 14, wherein at least one of the first machine and second machine is selected from a set consisting of Apple Macintosh and Windows PC.

21. The method of claim 14, wherein the machine attribute is a machine state based on a machine-specific attribute selected from a group consisting of a clock, a ROM serial number, and a hardware address.

22. A non-transitory machine-readable storage medium that provides instructions, which when executed by a machine, cause the machine to perform operations comprising:
receiving a first object code block in a format suitable for execution by a first machine;
translating the first object code block into a second object code block in a format executable by a second machine, wherein the translating includes applying tamper-resistance techniques to the first object code block or the second object code block, and
wherein the tamper resistance techniques include determining an identifier based on a machine attribute or a user attribute and inserting additional code into the first object code block or the second object code block, wherein the second object code block fails to execute without the identifier;
executing the second object code block;
receiving a system call formatted for requesting a service from a first operating system, wherein the system call is included in the first object code block;
determining which system call services of a second operating system are needed for providing the service;
determining whether the system call services for providing the service are disabled, wherein the determining is based on a tamper-resistance policy; and
servicing the system call when the system call services are not disabled.

23. The non-transitory machine-readable storage medium of claim 22, wherein the tamper resistance techniques include adding object code that produces ancillary results to the first object code block or the second object code block, and wherein the second object code block fails to execute without the ancillary results.

24. The non-transitory machine-readable storage medium of claim 22, wherein the first object code block includes byte codes which are in a format suitable for execution on the first machine.

25. The non-transitory machine-readable storage medium of claim 22, wherein the first machine is a virtual machine.

26. The non-transitory machine-readable storage medium of claim 22, wherein the tamper-resistance techniques include obfuscating the first object code block or the second object code block.

27. The non-transitory machine-readable storage medium of claim 22, wherein the second machine is a virtual machine.

28. The non-transitory machine-readable storage medium of claim 22, wherein the translating includes determining a checksum or digital signature based on the second object code block, and wherein the checksum or digital signature is verified before executing the second object code block.

* * * * *